Figure 1:
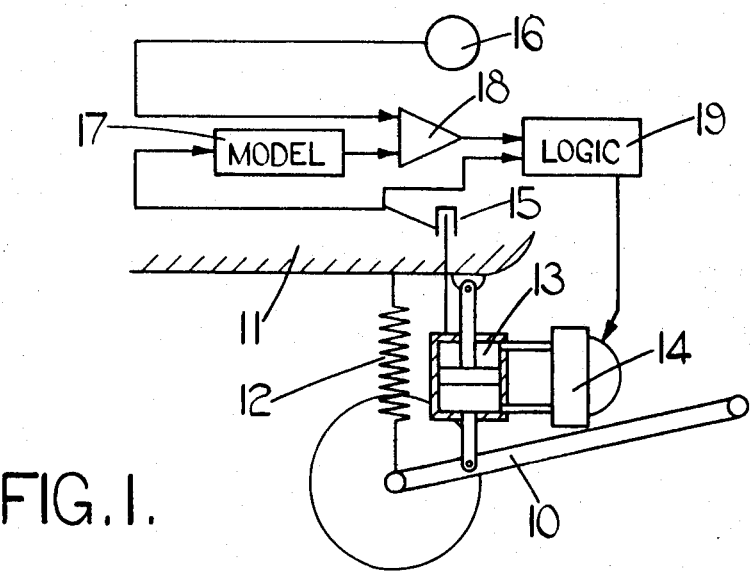

United States Patent [19]

Glaze

[11] 3,995,883
[45] Dec. 7, 1976

[54] LAND VEHICLE WHEEL SUSPENSION ARRANGEMENTS

[75] Inventor: Stanley George Glaze, Brierley Hill, England

[73] Assignee: Lucas Aerospace Limited, Birmingham, England

[22] Filed: Aug. 26, 1974

[21] Appl. No.: 500,577

[30] Foreign Application Priority Data

Nov. 21, 1973   United Kingdom ............ 54259/73

[52] U.S. Cl. ........................... 280/707; 180/105 E
[51] Int. Cl.² ......................................... B60G 11/26
[58] Field of Search ....... 280/112 R, 112 A, 124 R, 280/6 R, 124 F, 702, 706, 707; 180/100, 103, 104, 105 R, 105 E

[56] References Cited
UNITED STATES PATENTS

| | | | |
|---|---|---|---|
| 3,124,368 | 3/1964 | Corley | 280/112 |
| 3,427,038 | 2/1969 | Gauss | 280/124 R |
| 3,770,292 | 11/1973 | Palazzetti | 280/124 F |

*Primary Examiner*—Philip Goodman
*Assistant Examiner*—John A. Carroll
*Attorney, Agent, or Firm*—Andrus, Sceales, Starke & Sawall

[57] ABSTRACT

A wheel suspension arrangement for a wheel carrier including a suspension spring and a damper has a valve, controlling the damper. A displacement transducer detects the position of the wheel carrier relative to the vehicle body and provides an input to a function generator which produces an output corresponding to the required value of the acceleration of the wheel carrier. A comparator compares the actual acceleration with the desired acceleration and controls the valve accordingly.

5 Claims, 5 Drawing Figures

LAND VEHICLE WHEEL SUSPENSION ARRANGEMENTS

This invention relates to land vehicle wheel suspension arrangements and has an object to provide such an arrangement in a convenient form.

A land vehicle wheel suspension arrangement in accordance with the invention comprises a wheel carrier movably mounted on the vehicle body, spring means acting between said carrier and the body, an hydraulic damping device between the carrier and the body, a displacement transducer arranged to produce a first signal corresponding to the position of the wheel carrier relative to the body, and an acceleration transducer on the vehicle body for producing a second signal corresponding to the vertical component of the acceleration of the body adjacent the wheel and a control device operable to vary the damping force of the damping device in accordance with said first and second signals so as to cause said second signal to attain a desired value as a function of said first signal.

The invention also resides in a land vehicle wheel suspension arrangement comprising a plurality of wheel carriers movably mounted on a vehicle body, hydraulic damping means, means for damping movement of said carrier and control means for said damping means and comprising:

i. means for generating first electrical signals dependent on the velocities, relative to a ground datum, of the axles of respective wheels on the vehicle,
ii. means for generating second electrical signals dependent on the velocities, relative to said ground datum, in a vertical plane, of a plurality of points on the vehicle body,
iii. means for generating third electrical signals dependent on the accelerations in said vertical planes of said points on the vehicle body,
iv. means responsive to said third electrical signals to generate fourth, fifth and sixth electrical signals respectively proportional to the vertical acceleration of the centre of gravity of said vehicle body, to the angular acceleration of said body about a first axis substantially parallel to said ground datum, and to the angular acceleration of said body about a second axis substantially parallel to said ground datum and perpendicular to said first axis,
v. means responsive to said first and second electrical signals to generate seventh, eighth and ninth electrical signals respectively proportional to calculated maximum acceptable values of said vertical acceleration and of said angular accelerations about said first and second axes, and
vi. means responsive to the differences between said fourth and seventh electrical signals, between said fifth and eighth electrical signals and between said sixth and ninth electrical signals to very the amount of damping applied to movement of said wheel axes relative to said body by damping applied to movement of said wheel axes relative to said body by damping devices respectively associated with the wheels.

Figure 4:
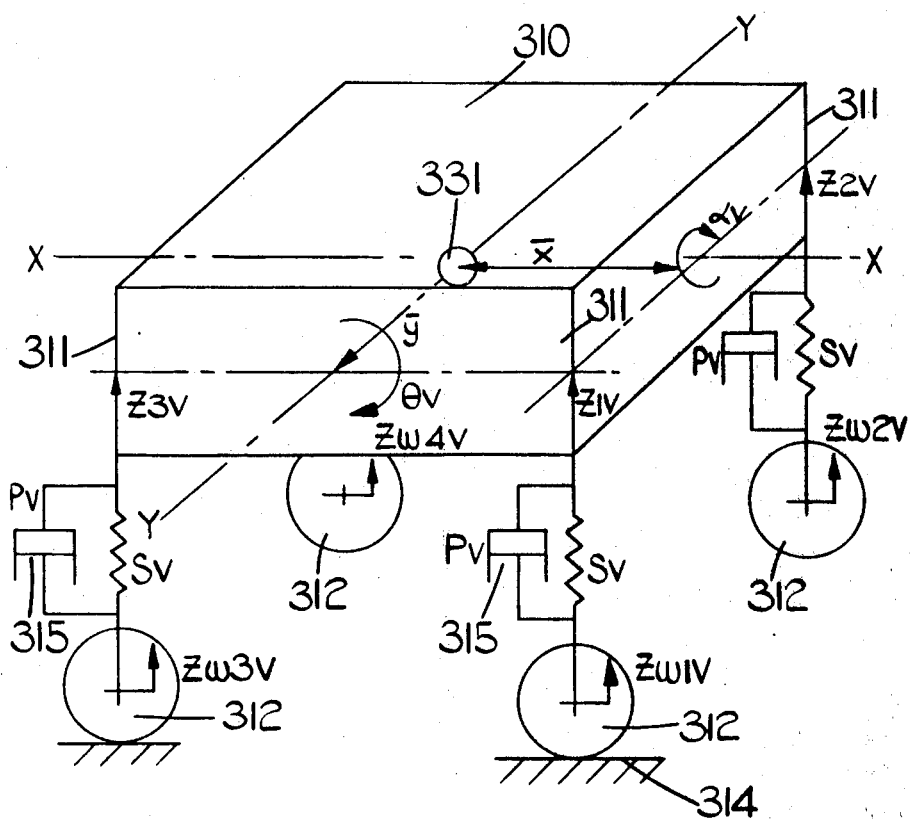
Figure 2:
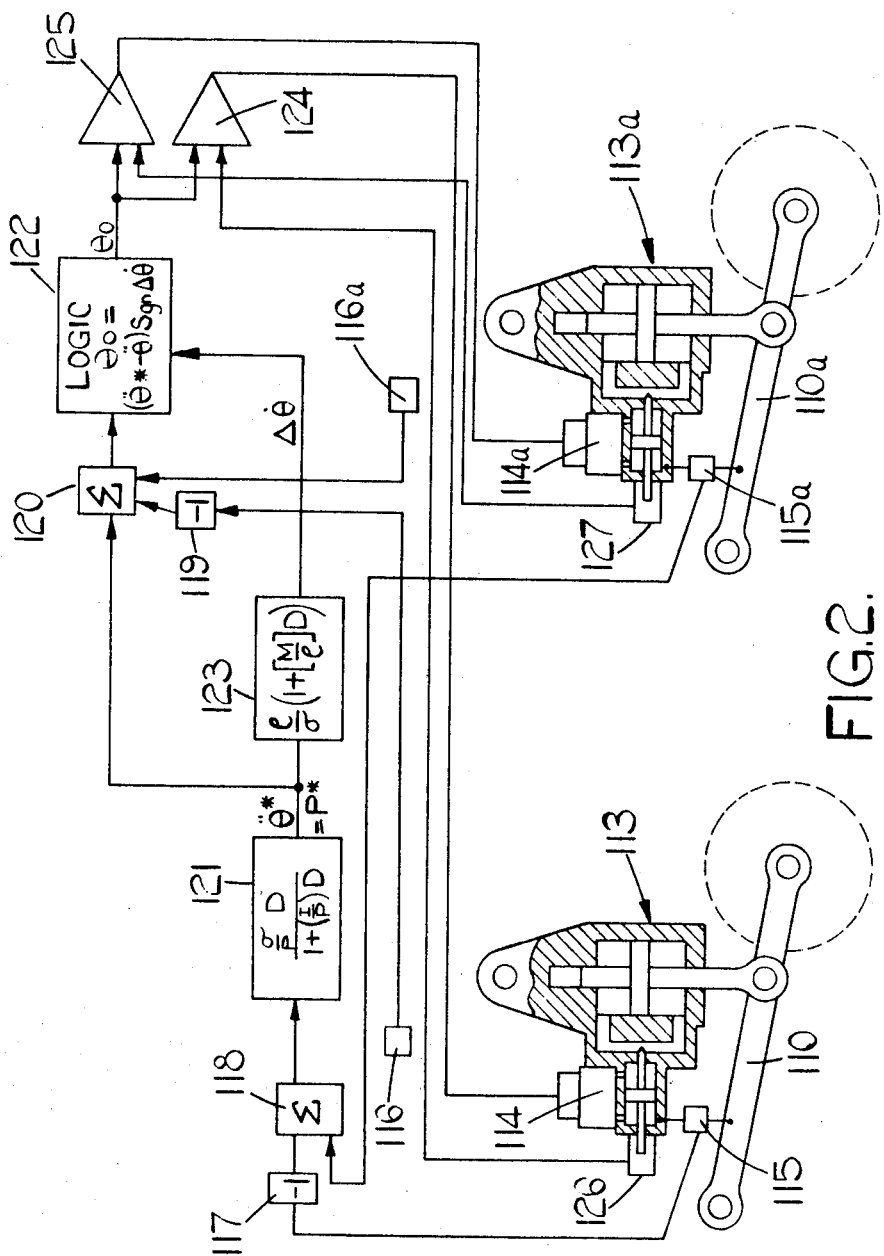
Figure 3:
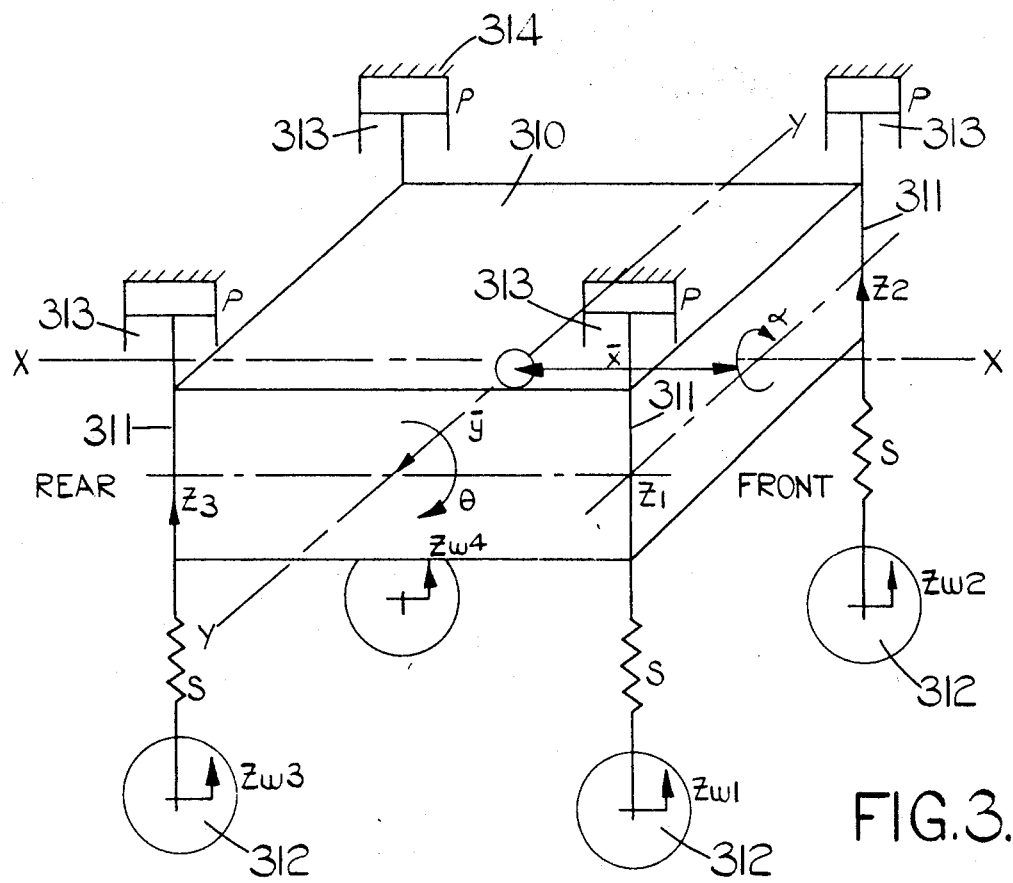
Figure 5:
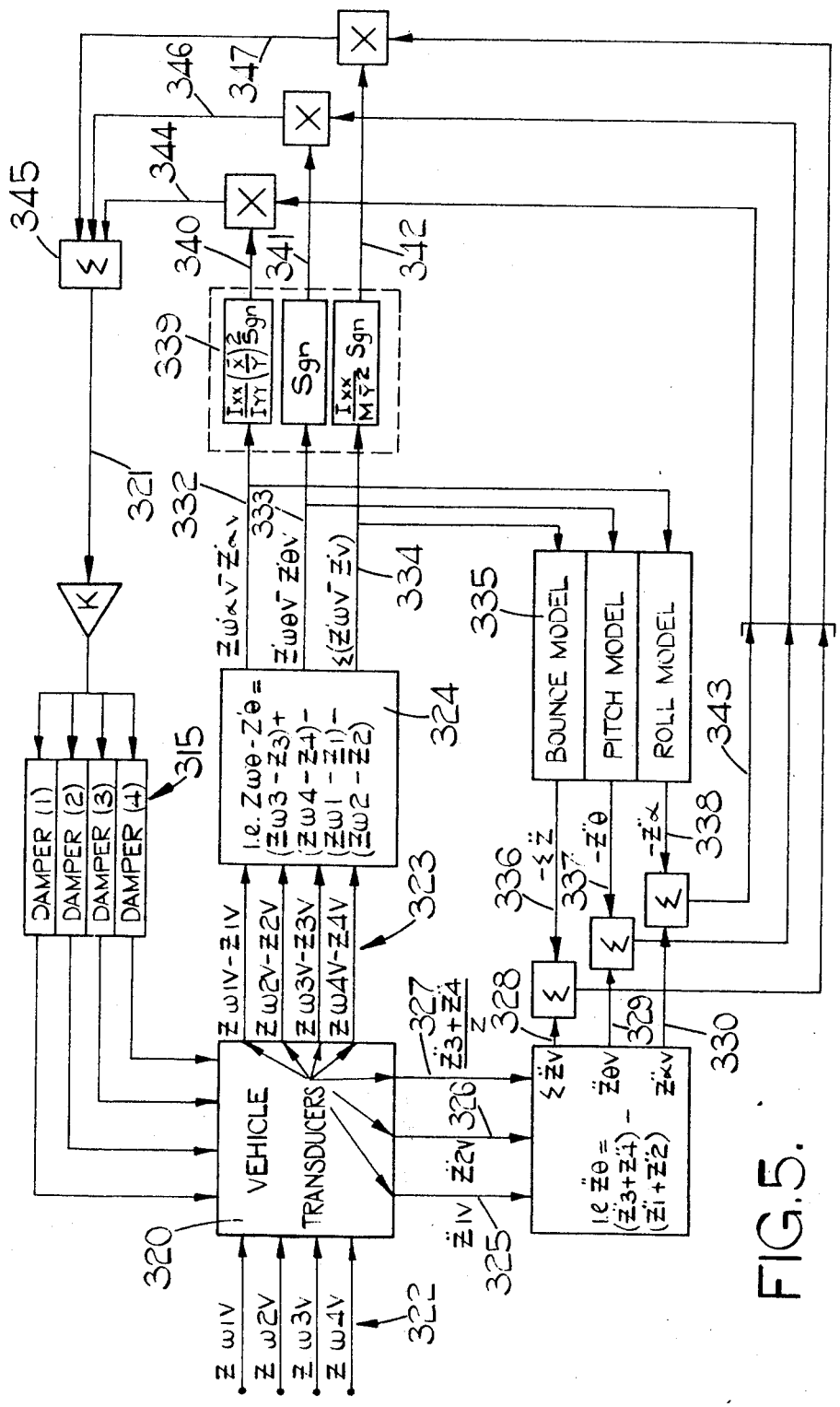

In the acompanying drawings:
FIG. 1 is a diagrammatic view of a single wheel suspension arrangement embodying an example of the invention,
FIG. 2 is a diagrammatic view of an alternative example of the invention as applied to the front and rear wheels at one side of a vehicle,
FIG. 3 shows, diagrammatically an idealised model of a four wheel suspension arrangement,
FIG. 4 shows, diagrammatically a suspension arrangement for a vehicle, and
FIG. 5 is a block diagram of a control system for the suspension arrangement of FIG. 4.

The example shown in FIG. 1 includes a wheel carrier 10 which is mounted on the vehicle body 11 to permit the body 11 to rise and fall relative to the wheel. A spring 12 acts between the body 11 and the carrier 10 which are also connected by an hydraulic damping cylinder 13 the flow of liquid between the ends of which is controlled by an electromagnetic servo-valve 14.

A position transducer 15 is provided for producing an electrical signal corresponding to the position of the wheel carrier 10 relative to the body 11. A vertical acceleration transducer 16 is also provided on the body 11 adjacent the wheel position. The signal from the transducer 15 is fed to a function generator circuit 17 which produces an output signal corresponding to the desired value of the body acceleration for the existing measured value of the position of the wheel relative to the vehicle. The output of the generator 17 and that of the acceleration transducer 16 are compared in a comparator circuit 18 and the resulting error signal together with the position transducer signal are supplied to a logic circuit 19 which controls the valve 14.

The variable damping applied to the damping device 13 effects control of the vertical acceleration to cause the error signal from the comparator 18 to be minimised. The function generator 17 can be designed to provide a wide range of different response characteristics.

In the arrangement shown in FIG. 2 two wheel carriers 110, 110a mounted on torsion bars (not shown) are employed for the front and rear wheels at one side of the vehicle. Each carrier has an hydraulic damper 113, 113a associated with it and these are similar in design and function to that shown in FIG. 1, each having a variable damping restrictor controlled by an electromagnetic servo-valve 114, 114a. Each carrier has a position transducer 115, 115a connected to the vehicle body and there is an acceleration transducer 116, 116a on the body above each wheel to measure the vertical component of the body acceleration at that point.

In this case the control systems for the damping valves are interconnected so that the absolute values of the front and rear body displacement and body acceleration are not taken into account, but only the differences between the front and rear. Thus the outputs of the front position transducer 115 is inverted by an inverting circuit 117 and then combined in a summing circuit 118 with the output of the rear position transducer 115a. Thus when the front and rear of the vehicle body rise and fall in unison, as in the bouncing and rolling modes of body motion, the circuit 118 will produce no output. Similarly, the front acceleration transducer 116 has its output inverted by an inverting circuit 119 before summing with the output of the rear acceleration transducer 116a in a summing circuit 120.

The output of the circuit 118 is supplied to a function generator 121 which produces an output corresponding to the desired acceleration differential in the existing displacement differential condition. This function could take many different forms but in the example described takes the form $$\theta^* = \frac{\frac{\sigma}{e} D}{1 + \frac{I}{e} D} \theta$$

where
$\theta^*$ is the desired acceleration differential,
$\sigma$ is the desired stiffness,
$e$ is the desired damping,
$I$ is the moment of inertia of the body, and
$\theta$ is the displacement differential,
(D is the differential operator).

The output of the function generator 121 is supplied to the summer circuit 120 so that this actually produces an output corresponding to the difference between the desired acceleration differential and the actual acceleration differential.

The output of the circuit 120 is fed to a logic circuit 122 which also receives a second input from a second function generator 123 which produces an output corresponding to the existing angular motion of the body relative to the road by applying the function.

$$\Delta \theta = \frac{e}{\sigma} \left( 1 + \left[ \frac{M}{e} \right] D \right)$$

when M is the body mass
to the output of the function generator 121. The $\Delta \theta$ input to the logic circuit 122 determines the sign of the output of the circuit 122.

Circuit 122 drives two servo-amplifiers 124, 125 controlling the valves 114, 114a respectively and also receiving position feedback signals from transducer 126, 127 thereon.

Turning now to FIG. 3 the model shown is used for the derivation of equations of motion for the vehicle body 310, and differs from the arrangement shown in FIG. 4 in that supports 311, for the wheels 312 are provided with dampers 313 which are located between the supports 311 and a fixed horizontal ground reference datum 314, whereas the corresponding dampers 315 in FIG. 4 are located between the supports 311 and the wheels 312.

The body 310 is assumed to be rigid and to be symmetrical about its centre of gravity 316. Springs 317 are provided between the supports 311 and wheels 312. The dampers 313 and 315 are identical on all wheels.

In the description the following notation is used:

| | |
|---|---|
| $Z_{w1, 2}$ etc. | Vertical wheel displacement. |
| $Z_{1, 2}$ etc. | Vertical wheel support displacement. |
| X, Y | Centre of gravity co-ordinates. |
| $I_{xx}$ | Body inertia in roll. |
| $I_{yy}$ | Body inertia in pitch. |
| M | Body mass. |
| S | Spring stiffness. |
| $\rho$ | Damper coefficient. |
| $\theta$ | Pitch angle. |
| $\alpha$ | Roll angle. |
| K | Control gain |
| $A_b$ | Bounce and roll weighting coefficients. |
| $A_r$ | |
| $Z_\theta$ | Control inputs - see text. |
| $Z_\alpha$ | |
| $\Sigma Z$ | |

Note: Suffix V
Denotes vehicle parameter, as opposed to an "ideal model" parameter.

From FIG. 3, for small values of $\theta$ and $$\theta = \left\{ \frac{Z_3 + Z_4}{2} - \frac{Z_1 + Z_2}{2} \right\} \frac{1}{2x} \tag{1}$$

$$= \left\{ \frac{Z_1 + Z_3}{2} - \frac{Z_2 + Z_4}{2} \right\} \frac{1}{2Y} \tag{2}$$

For vertical translations:

$$(\Sigma Z_w - \Sigma Z)S = \frac{MD^2}{4} \Sigma Z + \rho D \Sigma Z$$

Whence $$D^2 \Sigma Z = \frac{(S/\rho) D\Sigma (Z_w - Z)}{(M/4\rho) D + 1} = f(\Delta Z, t) \tag{3}$$

For pitch (Ignoring inertial cross-coupling):
Let $Z_\theta = Z_3 + Z_4 - Z_1 - Z_2 \ldots$ (4)

and $Z_{w\theta} = Z_{w3} + Z_{w4} - Z_{w1} - Z_{w2} \ldots$ (5)

Then it can be shown that $$D^2 Z_\theta = \frac{(S/\rho) D (Z_{w\theta} - Z_\theta)}{(I_{yy}/4y\rho^2) D + 1} = f(\Delta Z_\theta, t) \tag{6}$$

and similarly for roll
When
$Z_\alpha = Z_1 + Z_3 - Z_2 - Z_4 \ldots$ (7)

$Z_{w\alpha} = Z_{w1} + Z_{w3} - Z_{w2} - Z_{w4} \ldots$ (8)

$$D^2 Z_\alpha = \frac{(S/\rho D)(Z_{w\alpha} - Z_\alpha)}{(I_{xx}/4X\rho^2)D + 1} = f(\Delta Z_\alpha, t) \tag{9}$$

wherein it will be noted that $Z_{w\alpha} - Z_\alpha$ and $Z_{w\theta} - Z_\theta$ are measurable on a real vehicle from relative wheel displacements. Finally as the vehicle is assumed rigid the four variables Z are inter-related by
$Z_1 + Z_4 = Z_2 + Z_3 \ldots$ (10)

which implies that it is only necessary to measure three spatially separated accelerations.

From FIG. 4 it can be seen that the necessary difference in the vehicle equations can be established by replacing in equations (3), (6) and (9), S by $S_v + _v D$ and setting $= O$. Thus we easily obtain:

$$D^2 \Sigma Z_v = 4 \left\{ (S_v/M) + (\rho_v/M)D \right\} \Sigma (Zw_v - Z_v) \tag{11}$$

$$D^2 Z_{\theta v} = 4 \left\{ (S_v \bar{Y}^2/I_{xx}) + (\rho_v \bar{Y}^2/I_{xx})D \right\} \left\{ (Z_{w\theta v} - Z_\theta) \right\} \quad (12)$$

$$D^2 Z_{\alpha v} = 4 \left\{ (S_v \bar{X}^2/I_{yy}) + (\rho_v \bar{X}^2/I_{yy})D \right\} \left\{ (Z_{w\alpha v} - X) \right\} \quad (13)$$

Control of movement of the vehicle body 10 in any one mode, i.e. vertical movement, pitch about axis yy, or roll about axis xx, can be controlled by modelling equation (6) for example, applying the input ($Z_w$ , $v$ − $Z$ , $v$) measured on the vehicle, and then minimising the acceleration errors ($D^2 Z$ , − $D^2 Z$ , $v$)$^2$. However, the sensing of one mode error may invoke an untimely input to the dampers 313 for the control of some other mode, and the modes become cross coupled by such a strategy.

Since vehicle motions in all modes may not be equally unpleasant for the occupants, the expressions for the various modes are weighted. The sum of the weighted expressions for the three modes of movement gives a function, referred to as the "Cost Function", which is required to be minimised.

It is proposed that the control system be arranged to provide damping of wheel movement in which the sum of the squares of the mode expressions is minimised.

It is thus required that there shall be minimisation of the Cost Function:

$$CF = A_b(D^2 \Sigma Z - D^2 \Sigma Z_v)^2 + (D^2 Z_\theta - D^2 Z_{\theta\, v})^2 + A_r(D^2 Z_\alpha + D^2 Z_{\alpha\, v})^2 = C.F. \ldots \quad (14)$$

where $A_b$ and $A_r$ are weighting constants for bounce and roll and anticipated to be less than unity.

Generalising the model accelerations in the form $f(\Delta Z, t)$ the Cost Function may be expressed as:

$$C.F. = A_b \left\{ \left( (4S_v/M)\Sigma(Z_{wv} - Z_v) + (4\rho_v/M)\Sigma \overline{(Z_{wv} - Z_v)} \right) - f(\Delta z, t) \right\}^2$$

$$+ \left\{ \left( (4S_v \bar{Y}^2/I_{xx})(Z_{w\theta v} - Z_\theta) + (4\rho v \bar{Y}^2/I_{yy}) \overline{Z_{w\theta} - Z_{\theta v}} \right) - f(\Delta Z_\theta, t) \right\}^2$$

$$+ A_r \left\{ \left( (S_v \bar{X}^2/I_{yy})(Z_{w\alpha v} - Z_{\alpha v}) + (4\rho_v \bar{X}^2/I_{yy}) \overline{Z_{wv} - Z_v} \right) - f(\Delta Z_\alpha, t) \right\}^2$$

Now assuming that only the values of the damper coefficients are to be changed, and that they can be changed quickly enough that changes in $Z_w$, $Z$ etc. can be neglected, the minimum in C.F. occurs when $\delta$ C.F.)/$\delta\rho = 0$, i.e. when $$0 = \frac{\delta(C.F.)}{\delta\rho}$$

$$2A_b \Sigma(\ddot{Z}_v - \ddot{Z}) 4 \overline{(Z_{wv} - Z_v)} /M +$$

$$2 \ (\ddot{Z}_{\theta r} - \ddot{Z}_\theta) 4 \overline{(Z_{w\theta r} - Z_{\theta r})} \bar{Y}^2/I_{xx} +$$

$$2A_r \ (\ddot{Z}_v - \ddot{Z}) 4 \overline{(Z_{wv} - Z_{\theta v})} \bar{X}^2/I_{yy}$$

and this specifies a control of the form $$-K \left\{ (I_{xx}/M\bar{Y}^2) A_b \sum \overline{(Z_{wv} - Z_v)} (\ddot{Z}_r - \ddot{Z}) \cdot \right.$$

$$\overline{(Z_{w\theta r} - Z_{\theta r})} (\ddot{Z}_{\theta r} - \ddot{Z}_\theta)$$

$$\left. \left( \frac{I_{xx}}{I_{yy}} \frac{\bar{X}^2}{\bar{Y}^2} \right) A_r \overline{(Z_{war} - Z_{\alpha r})} (\ddot{Z}_{\alpha r} - \ddot{Z}_\alpha) \right\} \quad (15)$$

where K is large. However, since the change in $\rho$ needed to approach the minimum is governed by the sign of the C.F. derivative and the real need to change it by a large amount increases with the acceleration error, the final suggestion is that the value of $\rho$, obtained simultaneously on all four dampers should be ordained by the computation $$= -K \left\{ A_b I_{xx}/M\bar{Y}^2 \Sigma(\ddot{Z}_v - \ddot{Z}) \text{ Sgn } \overline{Z_{wv} - Z_v} + \right.$$

$$(\ddot{Z}_{\theta r} - \ddot{Z}_\theta) \text{ Sgn } \overline{Z_{w\theta v} - Z_{\theta v}} +$$

$$\left. \bar{X}^2 A_r I_{xx} \bar{Y}{-2} I_{yy} (\ddot{Z}_{\alpha v} - \ddot{Z}_\alpha) \text{ Sgn } \overline{Z_{w\alpha r} - Z_{\alpha v}} \right\} \quad (16)$$

It is also noted that because of the relationship (10) that it is only necessary to measure acceleration in three places to establish all the acceleration errors, and that only the very simplest velocity transducers are necessary for the sensing of relative wheel velocities in order to compute the correct sign for the individual terms in the control equation (15).

The block diagram shown in FIG. 5 shows the dampers 315 on the vehicle, and a group 320 of transducers. Variations in damping by the dampers 315 are conveniently obtained by providing the dampers with variable restricted orifices responsive to a control signal on a line 321.

A first set of transducers in the group 320 is responsive to inputs indicated at 322. The inputs 322 correspond to the displacements of the vehicle wheels 312 from an equilibrium rest position, and the first set of transducers provides first electrical signals corresponding to the velocities of the respective wheel axles, in a vertical plane, relative to the ground datum.

A second set of transducers in the group 320 comprises accelerometers on the wheel supports 311 which are used to generate second electrical signals corresponding to respective velocities, relative to the ground datum, of these supports 311.

There is provided on a group of four lines 323, to an arithmetic unit 324, signals which are respectively dependent on the differences between the aforesaid wheel velocities and their associated support velocities.

The aforesaid accelerometers in the group 320 also provides signals on lines 325, 326 respectively, corresponding to the vertical accelerations of two adjacent vehicle wheel supports. Also provided on a line 327 is a signal corresponding to the means acceleration of the remaining two supports. An arithmetic unit 328 is responsive to the signals on lines 325, 326, 327 to generate signals on lines 328, 329, 330. The signals on lines 328, 329, 330 are respectively proportional to the vertical acceleration of the centre of gravity 331 of the vehicle body 310 to the angular acceleration of the body 310 about axis YY, and to the angular acceleration of the body about axis XX.

Arithmetic unit 324 is responsive to the signals on lines 323 to provide, on lines 332, 333, 334 respectively, signals:

$$\dot{z}_w \alpha_v - \dot{z} \alpha_v$$

$$\dot{z}_w \theta_v - \dot{z}_\theta v$$

and $$(\dot{z}_{wv} - \dot{z}_v)$$

which are derived from the wheel displacements relative to the vehicle body 310, as referred to in connection with equations (6) and (9) above.

An electronic calculating device 335 is responsive to the signals on lines 332, 333, 334 respectively to provide, on lines 336, 337, 338, signals which respectively correspond to calculated maximum acceptable values of vertical acceleration of the centre of gravity 331, of angular aceleration about axis YY, and of angular acceleration about axis XX.

A further electronic calculating device 339 is responsive to the signals on lines 332, 333, 334 to generate signals on lines 340, 341, 342 respectively, The signal on line 340 is proportional to:

$$\frac{I_{uv} \left(\frac{\bar{X}}{\alpha}\right)^2}{I_{uv} Y}$$

multiplied by the sign of the value on line 332.

The signal on line 342 is proportional to:

$$\frac{I_{xx}}{M \bar{Y}^2}$$

multiplied by the sign of the value on line 334.

The signal on line 341 merely corresponds to the sign of the value on line 333.

The signal on line 340 is multiplied by a signal on a line 343 which represents the difference between the signals on the lines 330, 338, and the resultant product is supplied on a line 344 to a summer 345. Similarly the summer is supplied, on lines 346, 347 respectively, with signals which correspond to the product of the value on line 341 and the difference between the values on lines 329, 337, and to the product of the value on line 342 and the difference between the values on lines 328, 336.

The output of the summer 345 thus provides, on line 321, a signal corresponding to the value of the equation (16), that is the minimum value of the Cost Function to provide satisfactory damping of vehicle movement.

I claim:

1. A land vehicle wheel suspension arrangement comprising a wheel carrier movably mounted on the vehicle body, spring means acting between said carrier and the body, an hydraulic damping device between the carrier and the body for absorbing forces appearing in said spring means and having adjustable force absorbing and acceleration controlling properties, a displacement transducer arranged to produce a first signal corresponding to the position of the wheel carrier relative to the body, and an acceleration transducer on the vehicle body for producing a second signal corresponding to the vertical component of the acceleration of the body adjacent the wheel, and a control device operable to vary the force absorbing properties of the damping device in accordance with a combination of said first and second signals so as to cause the acceleration of said body to be dependent on the position of said wheel carrier relative to said body.

2. A land vehicle wheel suspension arrangement as claimed in claim 1 in which there are a plurality of said wheel carriers, a plurality of said spring means, a plurality of damping devices and a plurality of displacement and acceleration transducers associated respectively with the wheel carriers the control device for said damping devices receiving signals from all of said transducers so as to be sensitive to relatively different motions of the wheel carriers.

3. A land vehicle wheel suspension arrangement as claimed in claim 2 in which the wheel carriers are for front and rear wheels on the same side of the vehicle body, the control device being unaffected by bouncing or rolling motion of the vehicle body, but being effective to vary the damping force of the damping devices to control pitching motion of the vehicle body.

4. A land vehicle wheel suspension arrangement comprising a plurality of wheel carriers movably mounted on a vehicle body, hydraulic damping means, means for damping movement of said carriers and control means for said damping means and comprising:
   i. means for generating first electrical signals dependent on the velocities, relative to the ground datum, of the axles of respective wheels on the vehicle,
   ii. means for generating second electrical signals dependent on the velocities, relative to said ground datum, in a vertical plane, of a plurality of points on the vehicle body,
   iii. means for generating third electrical signals dependent on the accelerations in said vertical planes of said points on the vehicle body,
   iv. means responsive to said third electrical signals to generate fourth, fifth and sixth electrical signals respectively proportional to the vertical acceleration of the centre of gravity of said vehicle body, to the angular acceleration of said body about a first axis substantially parallel to said ground datum, and to the angular acceleration of said body about a second axis substantially parallel to said ground datum and perpendicular to said first axis.

v. means responsive to said first and second electrical signals to generate seventh, eighth and ninth electrical signals respectively proportional to calculated maximum acceptable values of said vertical acceleration and of said angular accelerations about said first and second axes, and vi. means responsive to the differences between said fourth and seventh electrical signals, between said fifth and eighth electrical signals and between said sixth and ninth electrical signals to vary the amount of damping applied to movement of said wheel axes relative to said body by damping applied to movement of said wheel axes relative to said body by damping devices respectively associated with the wheels.

5. A land vehicle wheel suspension arrangement comprising a wheel carrier movably mounted on the vehicle body, spring means acting between said carrier and the body, an hydraulic damping device between the carrier and the body for absorbing forces appearing in said spring means and having adjustable force absorbing and acceleration controlling properties, a displacement transducer arranged to produce a first signal corresponding to the position of the wheel carrier relative to the body, and an acceleration transducer on the vehicle body for producing a second signal corresponding to the vertical component of the acceleration of the body adjacent the wheel, said control device including a function generator to an input terminal of which the first signal is supplied and which produces an output signal corresonding to a desired value of the second signal, and a comparator controlling the damping device in accordance with the error between the second signal and the output signal from the function generator.

* * * * *